United States Patent
Gong et al.

(10) Patent No.: US 10,262,613 B2
(45) Date of Patent: Apr. 16, 2019

(54) GATE DRIVER ON ARRAY CIRCUIT AND LCD PANEL

(71) Applicant: Wuhan China Star Optoelectronics Technology Co., Ltd., Wuhan, Hubei (CN)

(72) Inventors: Qiang Gong, Hubei (CN); Gui Chen, Hubei (CN); Chao Wang, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 178 days.

(21) Appl. No.: 15/324,057

(22) PCT Filed: Aug. 26, 2016

(86) PCT No.: PCT/CN2016/096873
§ 371 (c)(1),
(2) Date: Jan. 5, 2017

(87) PCT Pub. No.: WO2018/023844
PCT Pub. Date: Feb. 8, 2018

(65) Prior Publication Data
US 2018/0182338 A1    Jun. 28, 2018

(30) Foreign Application Priority Data
Aug. 4, 2016 (CN) .......................... 2016 1 0632453

(51) Int. Cl.
*G09G 3/36* (2006.01)
*G02F 1/1345* (2006.01)
*G02F 1/1362* (2006.01)

(52) U.S. Cl.
CPC ....... *G09G 3/3677* (2013.01); *G02F 1/13454* (2013.01); *G02F 1/136286* (2013.01);
(Continued)

(58) Field of Classification Search
CPC .......... G02F 1/13454; G02F 1/136286; G09G 2310/0243; G09G 2310/0289;
(Continued)

(56) References Cited

U.S. PATENT DOCUMENTS 9,628,050 B2    4/2017  Zhao et al.
9,728,147 B2    8/2017  Xiao
(Continued)

FOREIGN PATENT DOCUMENTS

CN    104409054 A    3/2015
CN    104700799 A    6/2015
(Continued)

*Primary Examiner* — Robin J Mishler
(74) *Attorney, Agent, or Firm* — Muncy, Geissler, Olds & Lowe, P.C.

(57) ABSTRACT

The present disclosure provides a gate driver on array (GOA) circuit. A low level signal source is used to output a low level signal, a first high level signal source is used to output a first high level signal, and the second high level signal source is used to output the second high level signal. A cascade signal latch module is used to latch a cascade signal of a current grade. A gate driving signal generating module generates a preparation gate driving signal of the current grade. A gate driving signal outputting module is used to output a gate driving signal of the current grade.

15 Claims, 2 Drawing Sheets

(52) U.S. Cl.
 CPC ........ *G09G 2310/0243* (2013.01); *G09G 2310/0289* (2013.01); *G09G 2310/06* (2013.01); *G09G 2330/021* (2013.01)

(58) Field of Classification Search
 CPC ......... G09G 2310/06; G09G 2330/021; G09G 3/36; G09G 3/3677
 See application file for complete search history.

(56) References Cited

U.S. PATENT DOCUMENTS

| | | | |
|---|---|---|---|
| 9,786,240 B2 | 10/2017 | Zhao et al. | |
| 9,824,621 B2 | 11/2017 | Xiao et al. | |
| 2007/0075959 A1 | 4/2007 | Tobita | |
| 2015/0015556 A1* | 1/2015 | Pappas | H01L 27/1225 345/211 |
| 2016/0328076 A1* | 11/2016 | Pan | G06F 3/0416 |

FOREIGN PATENT DOCUMENTS

| | | | |
|---|---|---|---|
| CN | 104992653 A | 10/2015 | |
| CN | 105096853 A | 11/2015 | |
| CN | 105810165 A | 7/2016 | |

\* cited by examiner

GATE DRIVER ON ARRAY CIRCUIT AND LCD PANEL

BACKGROUND OF THE INVENTION

1. Field of the Invention

The present disclosure relates to the field of display drivers, and more particularly to a gate driver on array (GOA) circuit and a liquid crystal display (LCD) panel.

2. Description of the Prior Art

A gate driver on array circuit, abbreviated as GOA circuit, uses that a scan driving circuit is formed on an array substrate by processing of an array substrate of a traditional thin film transistor-liquid crystal display (TFT-LCD), thus, driving scan lines row by row is achieved.

Not only does the GOA circuit have cascade signal and timing signals, but the GOA circuit also has high level signals and low level signals. The high level signal is used to drive a logic unit in the circuit and also is used to drive an output unit in the circuit.

As a conventional GOA circuit uses a same high level signal to drive the logic unit and the output unit in the circuit, however, voltage for driving the high level signal of the logic unit is much less than voltage for driving the high level signal of the output unit. This causes power dissipation generated in driving the logic unit by the GOA circuit to be too high, further causing power dissipation of the corresponding liquid crystal display (LCD) panel to be too high.

Therefore, it is necessary to provide a GOA circuit and an LCD panel to solve the above issue of the prior art.

SUMMARY OF THE INVENTION

The aim of the present disclosure is to provide a gate driver on array (GOA) circuit and a liquid crystal display (LCD) panel capable of reducing power dissipation of the LCD panel to solve an issue of prior art that conventional GOA circuit has high power dissipation.

The present disclosure provides the GOA circuit, where the GOA circuit comprises:

a low level signal source outputting a low level signal, a first high level signal source outputting a first high level signal, a second high level signal source outputting a second high level signal, a cascade signal latch module latching a cascade signal of a current grade according to the low level signal and the first high level signal, a gate driving signal generating module generating a preparation gate driving signal of the current grade according to the low level signal, the first high level signal, and the cascade signal of the current grade; and, a gate driving signal outputting module outputting a gate driving signal of the current grade according to the low level signal, the first high level signal, and the preparation gate driving signal of the current grade;

voltage of the first high level signal is less than voltage of the second high level signal.

The gate driving signal outputting module comprises a first stage inverter, a second stage inverter, and a third stage inverter.

The first stage inverter outputs a primary gate driving signal of the current grade according to the low level signal, the first high level signal, and the preparation gate driving signal of the current grade.

The second stage inverter outputs a secondary gate driving signal of the current grade according to the low level signal, the first high level signal, and the primary gate driving signal of the current grade.

The third stage inverter outputs the gate driving signal of the current grade according to the low level signal, the second high level signal, and the secondary gate driving signal of the current grade.

When the gate driving signal of the current grade is at a high level, the gate driving signal of the current grade is the second high level signal.

When the gate driving signal of the current grade is at a low level, the gate driving signal of the current grade is the low level signal.

In the GOA circuit of the present disclosure, the first stage inverter comprises a first P-type metal oxide semiconductor (PMOS) transistor and a first N-type metal oxide semiconductor (NMOS) transistor.

An input end of the first NMOS transistor is connected with the low lever signal source, an output end of the first NMOS transistor is connected with the second stage inverter, and the preparation gate driving signal of the current grade is input to a control end of the first NMOS transistor.

An input end of the first PMOS transistor is connected with the first high level source, an output end of the first PMOS transistor is connected with the second stage inverter, and the preparation gate driving signal of the current grade is input to a control end of the first PMOS transistor.

In the GOA circuit of the present disclosure, the second stage inverter comprises a second P-type metal oxide semiconductor (PMOS) transistor and a second N-type metal oxide semiconductor (NMOS) transistor.

An input end of the second NMOS transistor is connected with the low lever signal source, an output end of the second NMOS transistor is connected with the third stage inverter, and the primary gate driving signal of the current grade is input to a control end of the second NMOS transistor.

An input end of the second PMOS transistor is connected with the first high level source, an output end of the second PMOS transistor is connected with the third stage inverter, and the primary gate driving signal of the current grade is input to a control end of the second PMOS transistor.

In the GOA circuit of the present disclosure, the third inverter comprises a third P-type metal oxide semiconductor (PMOS) transistor, a third N-type metal oxide semiconductor (NMOS) transistor, a fourth PMOS transistor, a fifth PMOS transistor, a sixth PMOS transistor, and a fourth NMOS transistor.

An input end of the third NMOS transistor is connected with the low lever signal source, an output end of the third NMOS transistor is connected with a control end of the fifth PMOS transistor, and the secondary gate driving signal of the current grade is input to a control end of the third NMOS transistor.

An input end of the third PMOS transistor is connected with an output end of the fourth PMOS transistor, an output end of the third PMOS transistor is connected with a control end of the fifth PMOS transistor, and the secondary gate driving signal of the current grade is input to the control end of the third PMOS transistor An input end of the fourth PMOS transistor is connected with the second high lever signal source, and a control end of the fourth PMOS transistor is connected with an output end of the sixth PMOS transistor.

An input end of the fifth PMOS transistor is connected with the second high level signal source, an output end of the fifth PMOS transistor is connected with an input end of the sixth PMOS transistor and outputs the gate driving signal of the current grade.

The primary gate driving signal of the current grade is input to a control end of the sixth PMOS transistor.

An input end of the fourth NMOS transistor is connected with the low level signal source, an output end of the fourth NMOS transistor is connected with a control end of the fourth PMOS transistor, and the primary gate driving signal of the current grade is input to the control end of the fourth NMOS transistor.

The present disclosure provides the GOA circuit, where the GOA circuit comprises:

a low level signal source outputting a low level signal, a first high level signal source outputting a first high level signal, a second high level signal source outputting a second high level signal, a cascade signal latch module latching a cascade signal of a current grade according to the low level signal and the first high level signal, a gate driving signal generating module generating a preparation gate driving signal of the current grade according to the low level signal, the first high level signal, and the cascade signal of the current grade; and, a gate driving signal outputting module outputting a gate driving signal of the current grade according to the low level signal, the first high level signal, and the preparation gate driving signal of the current grade;

voltage of the first high level signal is less than voltage of the second high level signal.

In the GOA circuit of the present disclosure, the gate driving signal outputting module comprises a first stage inverter, a second stage inverter, and a third stage inverter.

The first stage inverter outputs a primary gate driving signal of the current grade according to the low level signal, the first high level signal, and the preparation gate driving signal of the current grade The second stage inverter outputs a secondary gate driving signal of the current grade according to the low level signal, the first high level signal, and the primary gate driving signal of the current grade.

The third stage inverter outputs the gate driving signal of the current grade according to the low level signal, the second high level signal, and the secondary gate driving signal of the current grade.

In the GOA circuit of the present disclosure, the first stage inverter comprises a first P-type metal oxide semiconductor (PMOS) transistor and a first N-type metal oxide semiconductor (NMOS) transistor.

An input end of the first NMOS transistor is connected with the low lever signal source, an output end of the first NMOS transistor is connected with the second stage inverter, and the preparation gate driving signal of the current grade is input to a control end of the first NMOS transistor.

An input end of the first PMOS transistor is connected with the first high level source, an output end of the first PMOS transistor is connected with the second stage inverter, and the preparation gate driving signal of the current grade is input to a control end of the first PMOS transistor.

In the GOA circuit of the present disclosure, the second stage inverter comprises a second P-type metal oxide semiconductor (PMOS) transistor and a second N-type metal oxide semiconductor (NMOS) transistor.

An input end of the second NMOS transistor is connected with the low lever signal source, an output end of the second NMOS transistor is connected with the third stage inverter, and the primary gate driving signal of the current grade is input to a control end of the second NMOS transistor.

An input end of the second PMOS transistor is connected with the first high level source, an output end of the second PMOS transistor is connected with the third stage inverter, and the primary gate driving signal of the current grade is input to a control end of the second PMOS transistor.

In the GOA circuit of the present disclosure, the third inverter comprises a third P-type metal oxide semiconductor (PMOS) transistor, a third N-type metal oxide semiconductor (NMOS) transistor, a fourth PMOS transistor, a fifth PMOS transistor, a sixth PMOS transistor, and a fourth NMOS transistor.

An input end of the third NMOS transistor is connected with the low lever signal source, an output end of the third NMOS transistor is connected with a control end of the fifth PMOS transistor, and the secondary gate driving signal of the current grade is input to a control end of the third NMOS transistor.

An input end of the third PMOS transistor is connected with an output end of the fourth PMOS transistor, an output end of the third PMOS transistor is connected with a control end of the fifth PMOS transistor, and the secondary gate driving signal of the current grade is input to the control end of the third PMOS transistor.

An input end of the fourth PMOS transistor is connected with the second high lever signal source, and a control end of the fourth PMOS transistor is connected with an output end of the sixth PMOS transistor.

An input end of the fifth PMOS transistor is connected with the second high level signal source, an output end of the fifth PMOS transistor is connected with an input end of the sixth PMOS transistor and outputs the gate driving signal of the current grade.

The primary gate driving signal of the current grade is input to a control end of the sixth PMOS transistor.

An input end of the fourth NMOS transistor is connected with the low level signal source, an output end of the fourth NMOS transistor is connected with a control end of the fourth PMOS transistor, and the primary gate driving signal of the current grade is input to the control end of the fourth NMOS transistor.

In the GOA circuit of the present disclosure, when the gate driving signal of the current grade is at a high level, the gate driving signal of the current grade is the second high level signal.

When the gate driving signal of the current grade is at a low level, the gate driving signal of the current grade is the low level signal In the GOA circuit of the present disclosure, the cascade signal latch module comprises a fifth N-type metal oxide semiconductor (NMOS) transistor, a sixth NMOS transistor, a seventh NMOS transistor, an eighth NMOS transistor, a ninth NMOS transistor, a tenth NMOS transistor, a seventh P-type metal oxide semiconductor (PMOS) transistor, an eighth PMOS transistor, a ninth PMOS transistor, a tenth PMOS transistor, an eleventh PMOS transistor, a twelfth PMOS transistor, and a thirteenth PMOS transistor.

An input end of the fifth NMOS transistor is connected with the low level signal source, a first clock signal of the current grade is input to a control end of the fifth NMOS transistor, and an output end of the fifth NMOS transistor is connected with an output end of the seventh PMOS transistor.

An input end of the seventh PMOS transistor is connected with the first high level signal source, and the first clock signal of the current grade is input to a control end of the seventh PMOS transistor.

An input end of the seventh NMOS transistor is connected with the low level signal source, and the first clock signal of the current grade is input to a control end of the seventh NMOS transistor.

An input end of the eighth PMOS transistor is connected with an output end of the ninth PMOS transistor, an output end of the eighth PMOS transistor is connected with a control end of the tenth PMOS transistor, and the cascade signal of the current grade is input to a control end of the eighth PMOS transistor.

An input end of the ninth PMOS transistor is connected with the first high level signal source, and a control end of the ninth PMOS transistor is connected with an output end of the fifth NMOS transistor.

An control end of the eighth NMOS transistor is connected with a control end of the tenth PMOS transistor, an input end of the eighth NMOS transistor is connected with the low level signal source, and an input end of the eight NMOS transistor is connected with the gate driving signal generating module An input end of the tenth PMOS transistor is connected with the first high level signal source, and an output end of the tenth PMOS transistor is connected with the gate driving signal generating module An input end of the eleventh PMOS transistor is connected with the first high level signal source, a reset signal is input to a control end of the eleventh PMOS transistor, and an output end of the eleventh PMOS transistor is connected with a control end of the tenth PMOS transistor.

An input end of the twelfth PMOS transistor is connected with an output end of the thirteenth PMOS transistor, an output end of the twelfth PMOS transistor is connected with a control end of the tenth PMOS transistor, and a control end of the twelfth PMOS transistor is connected with the gate driving signal generating module.

An input end of the thirteenth PMOS transistor is connected with the first high level signal source, and the first clock signal of the current grade is input to a control end of the thirteenth PMOS transistor.

An input end of the ninth NMOS transistor is connected with an output end of the tenth NMOS transistor, an output end of the ninth NMOS transistor is connected with a control end of the tenth PMOS transistor, and a control end of the ninth NMOS transistor is connected with the gate driving signal generating module.

An input end of the tenth NMOS transistor is connected with the low level signal source, and an inverting first clock signal of the current grade is input to a control end of the tenth NMOS transistor In the GOA circuit of the present disclosure, the gate driving signal generating module comprises an eleventh N-type metal oxide semiconductor (NMOS) transistor, a twelfth NMOS transistor, a fourteenth P-type metal oxide semiconductor (PMOS) transistor, and a fifteenth PMOS transistor.

An input end of the fourteenth PMOS transistor is connected with the first high level signal source, an output end of the fourteenth PMOS transistor is connected with the gate driving signal outputting module, and a control end of the fourteenth PMOS transistor is connected with the cascade signal latch module An input end of the fifteenth PMOS transistor is connected with the first high level signal source, an output end of fifteenth PMOS transistor is connected with the gate driving signal outputting module, and a second clock signal of the current grade is input to a control end of the fifteenth PMOS transistor;

An input end of the eleventh NMOS transistor is connected with an output end of the twelfth NMOS transistor, an output end of the eleventh NMOS transistor is connected with the gate driving signal outputting module, and a control end of the eleventh NMOS transistor is connected with the cascade signal latch module An input end of the twelfth NMOS transistor is connected with the low level signal source, and the second clock signal of the current grade is input to a control end of the twelfth NMOS transistor.

The present disclosure provides a liquid crystal display (LCD) panel, comprising: a data line, a scan line, a pixel unit arranged between the data line and the scan line, and a gate driver on array (GOA) circuit.

the GOA circuit comprises:

a low level signal source outputting a low level signal, a first high level signal source outputting a first high level signal, a second high level signal source outputting a second high level signal, a cascade signal latch module latching a cascade signal of a current grade according to the low level signal and the first high level signal, a gate driving signal generating module generating a preparation gate driving signal of the current grade according to the low level signal, the first high level signal, and the cascade signal of the current grade; and, a gate driving signal outputting module outputting a gate driving signal of the current grade according to the low level signal, the first high level signal, and the preparation gate driving signal of the current grade Voltage of the first high level signal is less than voltage of the second high level signal.

In the LCD of the present disclosure, the gate driving signal outputting module comprises a first stage inverter, a second stage inverter, and a third stage inverter.

The first stage inverter outputs a primary gate driving signal of the current grade according to the low level signal, the first high level signal, and the preparation gate driving signal of the current grade.

The second stage inverter outputs a secondary gate driving signal of the current grade according to the low level signal, the first high level signal, and the primary gate driving signal of the current grade.

The third stage inverter outputs the gate driving signal of the current grade according to the low level signal, the second high level signal, and the secondary gate driving signal of the current grade.

In the LCD of the present disclosure, the first stage inverter comprises a first P-type metal oxide semiconductor (PMOS) transistor and a first N-type metal oxide semiconductor (NMOS) transistor.

An input end of the first NMOS transistor is connected with the low lever signal source, an output end of the first NMOS transistor is connected with the second stage inverter, and the preparation gate driving signal of the current grade is input to a control end of the first NMOS transistor.

An input end of the first PMOS transistor is connected with the first high level source, an output end of the first PMOS transistor is connected with the second stage inverter, and the preparation gate driving signal of the current grade is input to a control end of the first PMOS transistor.

In the LCD of the present disclosure, the second stage inverter comprises a second P-type metal oxide semiconductor (PMOS) transistor and a second N-type metal oxide semiconductor (NMOS) transistor.

An input end of the second NMOS transistor is connected with the low lever signal source, an output end of the second NMOS transistor is connected with the third stage inverter, and the primary gate driving signal of the current grade is input to a control end of the second NMOS transistor An input end of the second PMOS transistor is connected with the first high level source, an output end of the second PMOS transistor is connected with the third stage inverter, and the primary gate driving signal of the current grade is input to a control end of the second PMOS transistor In the LCD of the present disclosure, the third inverter comprises a third P-type metal oxide semiconductor (PMOS) transistor, a third N-type metal oxide semiconductor (NMOS) transistor, a fourth PMOS transistor, a fifth PMOS transistor, a sixth PMOS transistor, and a fourth NMOS transistor An input end of the third NMOS transistor is connected with the low lever signal source, an output end of the third NMOS transistor is connected with a control end of the fifth PMOS transistor, and the secondary gate driving signal of the current grade is input to a control end of the third NMOS transistor.

An input end of the third PMOS transistor is connected with an output end of the fourth PMOS transistor, an output end of the third PMOS transistor is connected with a control end of the fifth PMOS transistor, and the secondary gate driving signal of the current grade is input to the control end of the third PMOS transistor.

An input end of the fourth PMOS transistor is connected with the second high lever signal source, and a control end of the fourth PMOS transistor is connected with an output end of the sixth PMOS transistor.

An input end of the fifth PMOS transistor is connected with the second high level signal source, an output end of the fifth PMOS transistor is connected with an input end of the sixth PMOS transistor and outputs the gate driving signal of the current grade.

The primary gate driving signal of the current grade is input to a control end of the sixth PMOS transistor.

An input end of the fourth NMOS transistor is connected with the low level signal source, an output end of the fourth NMOS transistor is connected with a control end of the fourth PMOS transistor, and the primary gate driving signal of the current grade is input to the control end of the fourth NMOS transistor.

In the LCD of the present disclosure, when the gate driving signal of the current grade is at a high level, the gate driving signal of the current grade is the second high level signal.

When the gate driving signal of the current grade is at a low level, the gate driving signal of the current grade is the low level signal.

In the LCD of the present disclosure, the cascade signal latch module comprises a fifth N-type metal oxide semiconductor (NMOS) transistor, a sixth NMOS transistor, a seventh NMOS transistor, an eighth NMOS transistor, a ninth NMOS transistor, a tenth NMOS transistor, a seventh P-type metal oxide semiconductor (PMOS) transistor, an eighth PMOS transistor, a ninth PMOS transistor, a tenth PMOS transistor, an eleventh PMOS transistor, a twelfth PMOS transistor, and a thirteenth PMOS transistor.

An input end of the fifth NMOS transistor is connected with the low level signal source, a first clock signal of the current grade is input to a control end of the fifth NMOS transistor, and an output end of the fifth NMOS transistor is connected with an output end of the seventh PMOS transistor.

An input end of the seventh PMOS transistor is connected with the first high level signal source, and the first clock signal of the current grade is input to a control end of the seventh PMOS transistor.

An input end of the sixth NMOS transistor is connected with an output end of the seventh NMOS transistor, and an output end of the sixth NMOS transistor is connected with a control end of the eighth NMOS transistor, and the cascade signal of the current grade is input to a control end of the sixth NMOS transistor.

An input end of the seventh NMOS transistor is connected with the low level signal source, and the first clock signal of the current grade is input to a control end of the seventh NMOS transistor.

An input end of the eighth PMOS transistor is connected with an output end of the ninth PMOS transistor, an output end of the eighth PMOS transistor is connected with a control end of the tenth PMOS transistor, and the cascade signal of the current grade is input to a control end of the eighth PMOS transistor.

An input end of the ninth PMOS transistor is connected with the first high level signal source, and a control end of the ninth PMOS transistor is connected with an output end of the fifth NMOS transistor.

An control end of the eighth NMOS transistor is connected with a control end of the tenth PMOS transistor, an input end of the eighth NMOS transistor is connected with the low level signal source, and an input end of the eight NMOS transistor is connected with the gate driving signal generating module.

An input end of the tenth PMOS transistor is connected with the first high level signal source, and an output end of the tenth PMOS transistor is connected with the gate driving signal generating module.

An input end of the eleventh PMOS transistor is connected with the first high level signal source, a reset signal is input to a control end of the eleventh PMOS transistor, and an output end of the eleventh PMOS transistor is connected with a control end of the tenth PMOS transistor.

An input end of the twelfth PMOS transistor is connected with an output end of the thirteenth PMOS transistor, an output end of the twelfth PMOS transistor is connected with a control end of the tenth PMOS transistor, and a control end of the twelfth PMOS transistor is connected with the gate driving signal generating module.

An input end of the thirteenth PMOS transistor is connected with the first high level signal source, and the first clock signal of the current grade is input to a control end of the thirteenth PMOS transistor.

An input end of the ninth NMOS transistor is connected with an output end of the tenth NMOS transistor, an output end of the ninth NMOS transistor is connected with a control end of the tenth PMOS transistor, and a control end of the ninth NMOS transistor is connected with the gate driving signal generating module.

An input end of the tenth NMOS transistor is connected with the low level signal source, and an inverting first clock signal of the current grade is input to a control end of the tenth NMOS transistor.

In the LCD of the present disclosure, the gate driving signal generating module comprises an eleventh N-type metal oxide semiconductor (NMOS) transistor, a twelfth NMOS transistor, a fourteenth P-type metal oxide semiconductor (PMOS) transistor, and a fifteenth PMOS transistor.

An input end of the fourteenth PMOS transistor is connected with the first high level signal source, an output end of the fourteenth PMOS transistor is connected with the gate driving signal outputting module, and a control end of the fourteenth PMOS transistor is connected with the cascade signal latch module.

An input end of the fifteenth PMOS transistor is connected with the first high level signal source, an output end of fifteenth PMOS transistor is connected with the gate driving signal outputting module, and a second clock signal of the current grade is input to a control end of the fifteenth PMOS transistor.

An input end of the eleventh NMOS transistor is connected with an output end of the twelfth NMOS transistor, an output end of the eleventh NMOS transistor is connected with the gate driving signal outputting module, and a control end of the eleventh NMOS transistor is connected with the cascade signal latch module.

An input end of the twelfth NMOS transistor is connected with the low level signal source, and the second clock signal of the current grade is input to a control end of the twelfth NMOS transistor.

Compared with the GOA circuit and the LCD panel of prior art, the GOA circuit and the LCD panel of the present disclosure uses two high level signal source, which effectively reduces whole power dissipation of the GOA circuit, and solves issue of the prior art that the power dissipation of the GOA circuit and the LCD panel is high.

In order to more clearly illustrate the above content of the present disclosure, a description is made to the drawings which are needed for carrying out the embodiments. The description is as follow.

DETAILED DESCRIPTION OF THE PREFERRED EMBODIMENTS

The following description of every embodiment with reference to the accompanying drawings is used to exemplify a specific embodiment, which may be carried out in the present invention. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention.

In the drawings, the components having similar structures are denoted by the same numerals.

Figure 1:
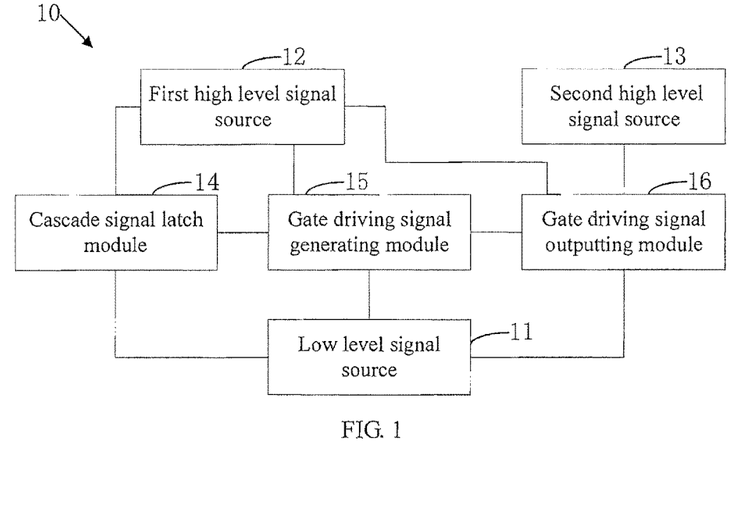
FIG. 1 is a structural diagram of a preferred embodiment of a gate driver on array (GOA) circuit of the present disclosure.

As shown in FIG. 1, FIG. 1 is a structural diagram of a preferred embodiment of a gate driver on array (GOA) circuit of the present disclosure. The GOA circuit 10 of the preferred embodiment of the present disclosure comprises a low level signal source 11, a first high level signal source 12, a second high level signal source 13, a cascade signal latch module 14, a gate driving signal generating module 15, and a gate driving signal outputting module 16.

The low level signal source 11 is used to output a low level signal (logic 0), the first high level signal source 12 is used to output a first high level signal (logic 1), the second high level signal source 13 is used to output a second high level signal (logic 1), and the cascade signal latch module 14 is used to latch a cascade signal of a current grade according to the low level signal and the first high level signal. The gate driving signal generating module 15 is used to generate a preparation gate driving signal of the current grade according to the low level signal, the first high level signal, and the cascade signal of the current grade. The gate driving signal outputting module 16 is used to output a gate driving signal of the current grade according to the low level signal, the first high level signal, and the preparation gate driving signal of the current grade. Voltage of the first high level signal is less than voltage of the second high level signal.

Figure 2:
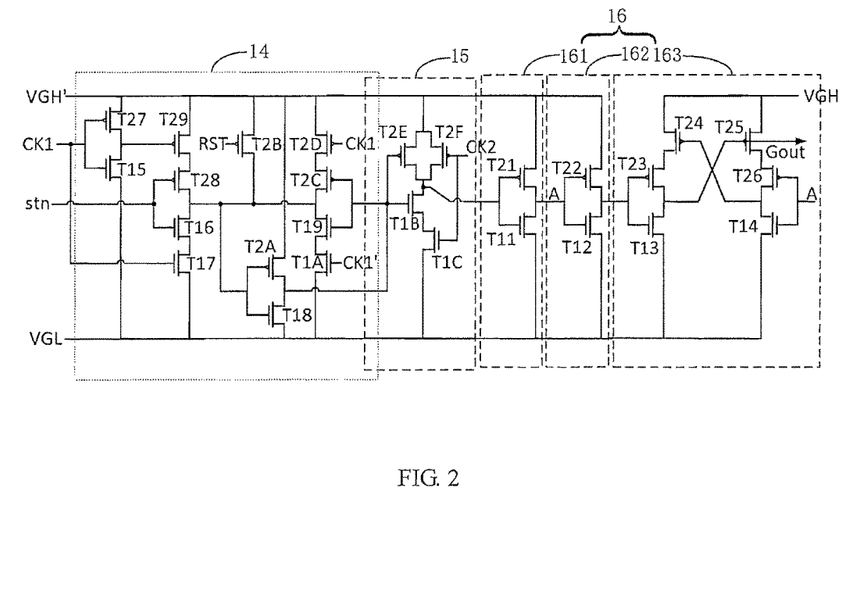
FIG. 2 is a specific circuit diagram of a preferred embodiment of the GOA circuit of the present disclosure.

As shown in the FIG. 2, FIG. 2 is a specific circuit diagram of a preferred embodiment of the GOA circuit of the present disclosure. The gate driving signal outputting module 16 comprises a first stage inverter 161, a second stage inverter 162, and a third stage inverter 163.

The first stage inverter 161 outputs a primary gate driving signal A of the current grade according to the low level signal, the first high level signal, and the preparation gate driving signal of the current grade. The second stage inverter 162 outputs a secondary gate driving signal of the current grade according to the low level signal, the first high level signal, and the primary gate driving signal of the current grade, and the third stage inverter 163 outputs the gate driving signal of the current grade according to the low level signal, the second high level signal, and the secondary gate driving signal of the current grade.

The first stage inverter 161 comprises a first P-type metal oxide semiconductor (PMOS) transistor T21 and a first N-type metal oxide semiconductor (NMOS) transistor T11, where an input end of the first NMOS transistor T11 is connected with the low lever signal source VGL, an output end of the first NMOS transistor T11 is connected with the second stage inverter 162, and the preparation gate driving signal of the current grade is input to a control end of the first NMOS transistor T11. An input end of the first PMOS transistor T21 is connected with the first high level source VGH', an output end of the first PMOS transistor T21 is connected with the second stage inverter, and the preparation gate driving signal of the current grade is input to a control end of the first PMOS transistor T21.

The second stage inverter 162 comprises a second PMOS transistor T22 and a second NMOS transistor T12, where an input end of the second NMOS transistor T12 is connected with the low lever signal source VGL, an output end of the second NMOS transistor T12 is connected with the third stage inverter 163, and the primary gate driving signal A of the current grade is input to a control end of the second NMOS transistor T12. An input end of the second PMOS transistor T22 is connected with the first high level source VGH', an output end of the second PMOS transistor T22 is connected with the third stage inverter 163, and the primary gate driving signal A of the current grade is input to a control end of the second PMOS transistor T22.

The third inverter 163 comprises a third PMOS transistor T23, a third NMOS transistor T13, a fourth PMOS transistor T24, a fifth PMOS transistor T25, a sixth PMOS transistor T26, and a fourth NMOS transistor T14, where an input end of the third NMOS transistor T13 is connected with the low lever signal source VGL, an output end of the third NMOS transistor T13 is connected with a control end of the fifth PMOS transistor T25, and the secondary gate driving signal of the current grade is input to a control end of the third NMOS transistor T13. An input end of the third PMOS transistor T23 is connected with an output end of the fourth PMOS transistor T24, an output end of the third PMOS transistor T23 is connected with a control end of the fifth PMOS transistor T25, and the secondary gate driving signal of the current grade is input to a control end of the third PMOS transistor T23. An input end of the third PMOS transistor T24 is connected with the high lever signal source VGH, a control end of the fourth PMOS transistor T24 is connected with an output end of the sixth PMOS transistor T26. An input end of the fifth PMOS transistor T25 is connected with the second high level signal source VGH, an output end of the fifth PMOS transistor T25 is connected with an input end of the sixth PMOS transistor T26 and outputs the gate driving signal Gout of the current grade. The primary gate driving signal A of the current grade is input to a control end of the sixth PMOS transistor T26. An input end of the fourth NMOS transistor T14 is connected with the low level signal source VGL, an output end of the fourth NMOS transistor T14 is connected with a control end of the fourth PMOS transistor T24, and the primary gate driving signal A of the current grade is input to the control end of the fourth NMOS transistor T14.

The cascade signal latch module comprises a fifth NMOS transistor T15, a sixth NMOS transistor T16, a seventh NMOS transistor T17, an eighth NMOS transistor T18, a ninth NMOS transistor T19, a tenth NMOS transistor T1A, a seventh PMOS transistor T27, an eighth PMOS transistor T28, a ninth PMOS transistor T29, a tenth PMOS transistor T2A, an eleventh PMOS transistor T2B, a twelfth PMOS transistor T2C, and a thirteenth PMOS transistor T2D.

An input end of the fifth NMOS transistor T15 is connected with the low level signal source VGL, a first clock signal CK1 of the current grade is input to a control end of the fifth NMOS transistor T15, and an output end of the fifth NMOS transistor T15 is connected with an output end of the seventh PMOS transistor T27.

An input end of the seventh PMOS transistor T27 is connected with the first high level signal source VGH', and a first clock signal CK1 of the current grade is input to a control end of the seventh PMOS transistor T27.

An input end of the sixth NMOS transistor T16 is connected with an output end of the seventh NMOS transistor T17, and an output end of the sixth NMOS transistor T16 is connected with a control end of the eighth NMOS transistor T18, and the cascade signal stn of the current grade is input to a control end of the sixth NMOS transistor T16.

An input end of the seventh NMOS transistor T17 is connected with the low level signal source VGL, and the first clock signal CK1 of the current grade is input to a control end of the seventh NMOS transistor T17.

An input end of the eighth PMOS transistor T28 is connected with an output end of the ninth PMOS transistor T29, an output end of the eighth PMOS transistor T28 is connected with a control end of the tenth PMOS transistor T2A, and the cascade signal stn of the current grade is input to a control end of the eighth PMOS transistor T28.

An input end of the ninth PMOS transistor T29 is connected with the first high level signal source VGH', and a control end of the ninth PMOS transistor T29 is connected with an output end of the fifth NMOS transistor T15.

A control end of the eighth NMOS transistor T18 is connected with a control end of the tenth PMOS transistor T2A, an input end of the eighth NMOS transistor T18 is connected with the low level signal source VGL, and an input end of the eight NMOS transistor T18 is connected with the gate driving signal generating module 15.

An input end of the tenth PMOS transistor T2A is connected with the first high level signal source VGH', and an output end of the tenth PMOS transistor T2A is connected with the gate driving signal generating module 15.

An input end of the eleventh PMOS transistor T2B is connected with the first high level signal source VGH', a reset signal is input to a control end of the eleventh PMOS transistor T2B, and an output end of the eleventh PMOS transistor T2B is connected with a control end of the tenth PMOS transistor T2A.

An input end of the twelfth PMOS transistor T2C is connected with an output end of the thirteenth PMOS transistor T2D, an output end of the twelfth PMOS transistor T2C is connected with a control end of the tenth PMOS transistor T2A, and a control end of the twelfth PMOS transistor T2C is connected with the gate driving signal generating module 15.

An input end of the thirteenth PMOS transistor T2D is connected with the first high level signal source VGH', and the first clock signal of the current grade is input to a control end of the thirteenth PMOS transistor T2D.

An input end of the ninth NMOS transistor T19 is connected with an output end of the tenth NMOS transistor T1A, an output end of the ninth NMOS transistor T19 is connected with a control end of the tenth PMOS transistor T2A, and a control end of the ninth NMOS transistor T19 is connected with the gate driving signal generating module 15.

An input end of the tenth NMOS transistor T1A is connected with the low level signal source VGL, and an inverting first clock signal of the current grade is input to a control end of the tenth NMOS transistor T1A.

The gate driving signal generating module 15 comprises an eleventh NMOS transistor T1B, a twelfth NMOS transistor T1C, a fourteenth PMOS transistor T2E, and a fifteenth PMOS transistor T2F.

An input end of the fourteenth PMOS transistor T2E is connected with the first high level signal source VGH', an output end of the fourteenth PMOS transistor T2E is connected with the gate driving signal outputting module 16, and a control end of the fourteenth PMOS transistor T2E is connected with the cascade signal latch module 14.

An input end of the fifteenth PMOS transistor T2F is connected with the first high level signal source VGH', an output end of fifteenth PMOS transistor T2F is connected with the gate driving signal outputting module 16, and a second clock signal CK2 of the current grade is input to a control end of the fifteenth PMOS transistor T2F.

An input end of the eleventh NMOS transistor T1B is connected with an output end of the twelfth NMOS transistor T1C, an output end of the eleventh NMOS transistor T1B is connected with the gate driving signal outputting module 16, and a control end of the eleventh NMOS transistor T1B is connected with the cascade signal latch module 14.

An input end of the twelfth NMOS transistor T1C is connected with the low level signal source VGL, and the second clock signal CK2 of the current grade is input to a control end of the twelfth NMOS transistor T1C.

Figure 3:
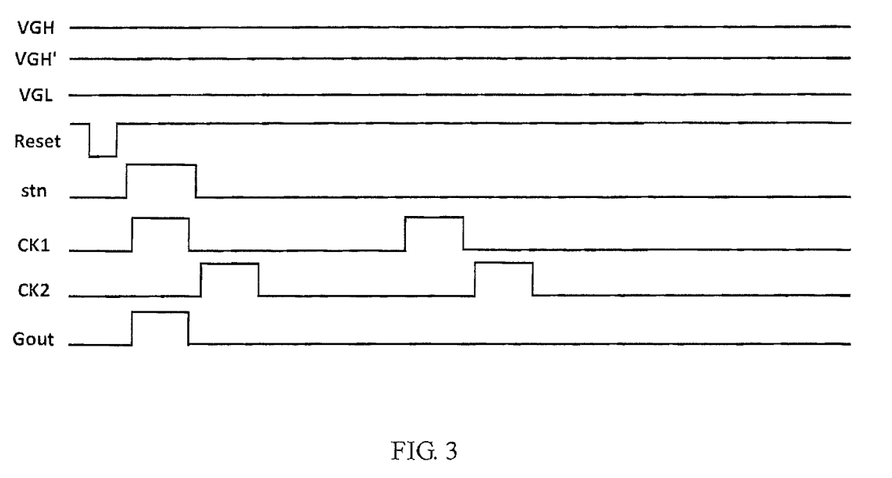
FIG. 3 is a schematic diagram of controlling timing sequence of each signal of a preferred embodiment of the GOA circuit of the present disclosure.

As shown in FIG. 3, FIG. 3 is a schematic diagram of controlling timing sequence of each signal of a preferred embodiment of the GOA circuit of the present disclosure. The GOA circuit 10 of the preferred embodiment works, when the cascade signal stn of the current grade is transferred to the high level, the first clock signal CK1 of the current grade also is transferred to the high level. At this time, the fifth NMOS transistor 15 turns on, the seventh PMOS transistor T27 turns off, and the ninth PMOS transistor T29 turns on.

The sixth NMOS transistor T16 turns on, the seventh NMOS transistor T17 turns on, the eighth PMOS transistor T28 turns off, and the low level signal of the low signal source VGL is input to the eighth NMOS transistor T18 and the tenth PMOS transistor T2A. Thus, the eighth NMOS transistor T18 turns off and the tenth PMOS transistor T2A turns on, and the first high level signal is input to the gate driving signal generating module 15, and the control ends of the ninth NMOS transistor T19 and the twelfth PMOS transistor T2C.

The twelfth PMOS transistor T2C turns off, the ninth NMOS transistor T19 turns on, the first clock signal CK1 of the current grade controls the thirteenth PMOS transistor T2D to turn off, the inverting first clock signal CK1' of current grade controls the tenth NMOS transistor T1A to turn off.

The first high level signal having a high level controls the fourteenth PMOS transistor T2E to turn off, the first high level signal having a high level controls the eleventh PMOS transistor T2B to turn on, and the second clock signal having a low level controls the fifteenth PMOS transistor T2F to turn on. Thus, the first high level signal (namely the preparation gate driving signal of the current grade) is input to the first stage inverter 161 of the gate driving signal outputting module 16.

The first NMOS transistor T11 of the first stage inverter 161 turns on, the first PMOS transistor T21 turns off, and the first stage inverter 161 outputs the low level signal (namely the primary gate driving signal A of the current grade) to the second stage inverter 162.

The second PMOS transistor of the second stage inverter 162 turns on, the second NMOS transistor turns off, the second stage inverter 162 outputs the first high level signal (namely the secondary gate driving signal of the current grade A) to the third stage inverter 163.

The secondary gate driving signal of the current grade of the first high level signal controls the third stage inverter 163, further, third PMOS transistor T23 turns off, and the third NMOS transistor T13 turns on. Thus, the low level signal is input to the control end of the fifth PMOS transistor T25, the second high level signal of the second high level signal source is output by the output end (Gout) of the fifth PMOS transistor T25 from the fifth PMOS transistor T25 (namely the gate driving signal of the current grade is output).

When the cascade signal of the current grade (stn) is transferred to the low level, the first clock signal CK1 of the current grade also is transferred to the low level, and the second clock signal CK2 of the current grade is transferred to the high level. Thus, the fifteenth PMOS transistor T2F turns off, and the second clock signal CK2 controls the twelfth NMOS transistor T1C to turn on. The low level signal (namely preparation gate driving signal of the current grade) is input to the first stage inverter 161 of the gate driving signal outputting module 16.

The first NMOS transistor T11 of the first stage inverter 161 turns off, the first PMOS transistor T21 turns on, and the first stage inverter 161 outputs the first high level signal (namely the primary gate driving signal A of the current grade) to the second stage inverter 162.

The second PMOS transistor T22 of the second stage inverter 162 turns off, the second NMOS transistor T12 turns on, the second stage inverter 162 outputs the low level signal (namely the secondary gate driving signal of the current grade A) to the third stage inverter 163.

The secondary gate driving signal of the current grade of the first low level signal controls the third stage inverter 163, further, the third PMOS transistor T23 turns on, the third NMOS transistor T13 turns off, the fourth NMOS transistor T14 turns on, and the sixth PMOS transistor T26 turns off. Thus, the low level signal is input to the control end of the fourth PMOS transistor T24, the fourth PMOS transistor T24 turns on. The second high level signal is input to the control end of the fifth PMOS transistor T25, and the fifth PMOS transistor T25 turns off, the output end of the fifth PMOS transistor T25 stops to output the gate driving signal of the current grade.

As the above, generating process of the gate driving signal of the GOA circuit 10 of the preferred embodiment is finished.

The GOA circuit of the preferred embodiment uses two high level signal sources, where the first high level signal having the low power dissipation generates the preparation gate driving signal, the primary gate driving signal A and the secondary gate driving signal, and the second high level signal having the high low power dissipation generates the gate driving signal. Thus, entire power dissipation of the GOA circuit is low, which reduces the power dissipation of the GOA circuit and the LCD panel.

The present disclosure provides the LCD panel, where the LCD panel comprises a data line, a scan line, a pixel unit arranged between the data line and the scan line, and the GOA circuit.

The GOA circuit comprises the low level signal source, the first high level signal source, the second high level signal source, the cascade signal latch module, the gate driving signal generating module, and the gate driving signal outputting module.

The low level signal source is used to output the low level signal, the first high level signal source is used to output the first high level signal, and the second high level signal source is used to output the second high level signal. The cascade signal latch module is used to latch the cascade signal of the current grade according to the low level signal and the first high level signal, the gate driving signal generating module generates the preparation gate driving signal of the current grade according to the low level signal, the first high level signal, and the cascade signal of the current grade. The gate driving signal outputting module is used to output the gate driving signal of the current grade according to the low level signal, the first high level signal, and the preparation gate driving signal of the current grade, where voltage of the first high level signal is less than voltage of the second high level signal.

Furthermore, the gate driving signal outputting module comprises the first stage inverter, the second stage inverter, and the third stage inverter. The first stage inverter outputs a primary gate driving signal A of the current grade according to the low level signal and the first high level signal, and the preparation gate driving signal of the current grade, the second stage inverter outputs the secondary gate driving signal of the current grade according to the low level signal, the first high level signal, and the primary gate driving signal A of the current grade, and the third stage inverter outputs the current grade gate driving signal according to the low level signal, the first high level signal, and the secondary gate driving signal of the current grade.

Description of a specific operating principle of the LCD panel of the present disclosure is same as or similar with the description of the above GOA circuit of the preferred embodiment, and the description of the specific operating principle of the LCD panel refers to the related description of the above GOA circuit of the preferred embodiment.

The GOA circuit and the LCD panel of the present disclosure use two high level signal sources, which reduces whole power dissipation of the GOA circuit, and solves issue of the prior art that the power dissipation of the GOA circuit and the LCD panel is high.

The GOA circuit of the present disclosure drives a scan signal for the corresponding pixel unit of the LCD panel, the LCD panel comprises the GOA circuit having a plurality of grades, the GOA circuit of each grade successively cascades by the cascade signal, and the GOA circuit of each grade outputs the scan signal for the scan signal of a current grade (namely the gate driving signal).

As the above, it should be understood that the present disclosure has been described with reference to certain preferred and alternative embodiments which are intended to be exemplary only and do not limit the full scope of the present disclosure as set fourth in the appended claims.

What is claimed is:

1. A gate driver on array (GOA) circuit, comprising:
a low level signal source outputting a low level signal;
a first high level signal source outputting a first high level signal;
a second high level signal source outputting a second high level signal;
a cascade signal latch module latching a cascade signal of a current grade according to the low level signal and the first high level signal;
a gate driving signal generating module generating a preparation gate driving signal of the current grade according to the low level signal, the first high level signal, and the cascade signal of the current grade; and
a gate driving signal outputting module outputting a gate driving signal of the current grade according to the low level signal, the first high level signal, and the preparation gate driving signal of the current grade;
wherein a voltage of the first high level signal is less than a voltage of the second high level signal;
wherein the gate driving signal outputting module comprises a first stage inverter, a second stage inverter, and a third stage inverter;
wherein the first stage inverter outputs a primary gate driving signal of the current grade according to the low level signal, the first high level signal, and the preparation gate driving signal of the current grade;
wherein the second stage inverter outputs a secondary gate driving signal of the current grade according to the low level signal, the first high level signal, and the primary gate driving signal of the current grade;
wherein the third stage inverter outputs the gate driving signal of the current grade according to the low level signal, the second high level signal, and the secondary gate driving signal of the current grade;
when the gate driving signal of the current grade is at a high level, the gate driving signal of the current grade is the second high level signal;
when the gate driving signal of the current grade is at a low level, the gate driving signal of the current grade is the low level signal;
wherein the third inverter comprises a third P-type metal oxide semiconductor (PMOS) transistor, a third N-type metal oxide semiconductor (NMOS) transistor, a fourth PMOS transistor, a fifth PMOS transistor, a sixth PMOS transistor, and a fourth NMOS transistor;
wherein an input end of the third NMOS transistor is connected with the low lever signal source, an output end of the third NMOS transistor is connected with a control end of the fifth PMOS transistor, and the secondary gate driving signal of the current grade is input to a control end of the third NMOS transistor;
wherein an input end of the third PMOS transistor is connected with an output end of the fourth PMOS transistor, an output end of the third PMOS transistor is connected with a control end of the fifth PMOS transistor, and the secondary gate driving signal of the current grade is input to the control end of the third PMOS transistor;
wherein an input end of the fourth PMOS transistor is connected with the second high lever signal source, and a control end of the fourth PMOS transistor is connected with an output end of the sixth PMOS transistor;
wherein an input end of the fifth PMOS transistor is connected with the second high level signal source, an output end of the fifth PMOS transistor is connected with an input end of the sixth PMOS transistor and outputs the gate driving signal of the current grade;
wherein the primary gate driving signal of the current grade is input to a control end of the sixth PMOS transistor;
wherein an input end of the fourth NMOS transistor is connected with the low level signal source, an output end of the fourth NMOS transistor is connected with a control end of the fourth PMOS transistor, and the primary gate driving signal of the current grade is input to the control end of the fourth NMOS transistor.

2. The GOA circuit as claimed in claim 1, wherein the first stage inverter comprises a first P-type metal oxide semiconductor (PMOS) transistor and a first N-type metal oxide semiconductor (NMOS) transistor,
wherein an input end of the first NMOS transistor is connected with the low lever signal source, an output end of the first NMOS transistor is connected with the second stage inverter, and the preparation gate driving signal of the current grade is input to a control end of the first NMOS transistor;
wherein an input end of the first PMOS transistor is connected with the first high level source, an output end of the first PMOS transistor is connected with the second stage inverter, and the preparation gate driving signal of the current grade is input to a control end of the first PMOS transistor.

3. The GOA circuit as claimed in claim 1, wherein the second stage inverter comprises a second P-type metal oxide semiconductor (PMOS) transistor and a second N-type metal oxide semiconductor (NMOS) transistor,
wherein an input end of the second NMOS transistor is connected with the low lever signal source, an output end of the second NMOS transistor is connected with the third stage inverter, and the primary gate driving signal of the current grade is input to a control end of the second NMOS transistor;
wherein an input end of the second PMOS transistor is connected with the first high level source, an output end of the second PMOS transistor is connected with the third stage inverter, and the primary gate driving signal of the current grade is input to a control end of the second PMOS transistor.

4. A gate driver on array (GOA) circuit, comprising
a low level signal source outputting a low level signal;
a first high level signal source outputting a first high level signal;

a second high level signal source outputting a second high level signal;

a cascade signal latch module latching a cascade signal of a current grade according to the low level signal and the first high level signal;

a gate driving signal generating module generating a preparation gate driving signal of the current grade according to the low level signal, the first high level signal, and the cascade signal of the current grade; and, a gate driving signal outputting module outputting a gate driving signal of the current grade according to the low level signal, the first high level signal, and the preparation gate driving signal of the current grade;

wherein voltage of the first high level signal is less than voltage of the second high level signal;

wherein the gate driving signal outputting module comprises a first stage inverter, a second stage inverter, and a third stage inverter;

wherein the first stage inverter outputs a primary gate driving signal of the current grade according to the low level signal, the first high level signal, and the preparation gate driving signal of the current grade;

wherein the second stage inverter outputs a secondary gate driving signal of the current grade according to the low level signal, the first high level signal, and the primary gate driving signal of the current grade;

wherein the third stage inverter outputs the gate driving signal of the current grade according to the low level signal, the second high level signal, and the secondary gate driving signal of the current grade;

wherein the third inverter comprises a third P-type metal oxide semiconductor (PMOS) transistor, a third N-type metal oxide semiconductor (NMOS) transistor, a fourth PMOS transistor, a fifth PMOS transistor, a sixth PMOS transistor, and a fourth NMOS transistor;

wherein an input end of the third NMOS transistor is connected with the low lever signal source, an output end of the third NMOS transistor is connected with a control end of the fifth PMOS transistor, and the secondary gate driving signal of the current grade is input to a control end of the third NMOS transistor;

wherein an input end of the third PMOS transistor is connected with an output end of the fourth PMOS transistor, an output end of the third PMOS transistor is connected with a control end of the fifth PMOS transistor, and the secondary gate driving signal of the current grade is input to the control end of the third PMOS transistor;

wherein an input end of the fourth PMOS transistor is connected with the second high lever signal source, and a control end of the fourth PMOS transistor is connected with an output end of the sixth PMOS transistor;

wherein an input end of the fifth PMOS transistor is connected with the second high level signal source, an output end of the fifth PMOS transistor is connected with an input end of the sixth PMOS transistor and outputs the gate driving signal of the current grade;

wherein the primary gate driving signal of the current grade is input to a control end of the sixth PMOS transistor;

wherein an input end of the fourth NMOS transistor is connected with the low level signal source, an output end of the fourth NMOS transistor is connected with a control end of the fourth PMOS transistor, and the primary gate driving signal of the current grade is input to the control end of the fourth NMOS transistor.

5. The GOA circuit as claimed in claim 4, wherein the first stage inverter comprises a first P-type metal oxide semiconductor (PMOS) transistor and a first N-type metal oxide semiconductor (NMOS) transistor, wherein an input end of the first NMOS transistor is connected with the low lever signal source, an output end of the first NMOS transistor is connected with the second stage inverter, and the preparation gate driving signal of the current grade is input to a control end of the first NMOS transistor;

wherein an input end of the first PMOS transistor is connected with the first high level source, an output end of the first PMOS transistor is connected with the second stage inverter, and the preparation gate driving signal of the current grade is input to a control end of the first PMOS transistor.

6. The GOA circuit as claimed in claim 4, wherein the second stage inverter comprises a second P-type metal oxide semiconductor (PMOS) transistor and a second N-type metal oxide semiconductor (NMOS) transistor, wherein an input end of the second NMOS transistor is connected with the low lever signal source, an output end of the second NMOS transistor is connected with the third stage inverter, and the primary gate driving signal of the current grade is input to a control end of the second NMOS transistor;

wherein an input end of the second PMOS transistor is connected with the first high level source, an output end of the second PMOS transistor is connected with the third stage inverter, and the primary gate driving signal of the current grade is input to a control end of the second PMOS transistor.

7. The GOA circuit as claimed in claim 4, when the gate driving signal of the current grade is at a high level, the gate driving signal of the current grade is the second high level signal;

when the gate driving signal of the current grade is at a low level, the gate driving signal of the current grade is the low level signal.

8. The GOA circuit as claimed in claim 4, wherein the cascade signal latch module comprises a fifth N-type metal oxide semiconductor (NMOS) transistor, a sixth NMOS transistor, a seventh NMOS transistor, an eighth NMOS transistor, a ninth NMOS transistor, a tenth NMOS transistor, a seventh P-type metal oxide semiconductor (PMOS) transistor, an eighth PMOS transistor, a ninth PMOS transistor, a tenth PMOS transistor, an eleventh PMOS transistor, a twelfth PMOS transistor, and a thirteenth PMOS transistor;

wherein an input end of the fifth NMOS transistor is connected with the low level signal source, a first clock signal of the current grade is input to a control end of the fifth NMOS transistor, and an output end of the fifth NMOS transistor is connected with an output end of the seventh PMOS transistor;

wherein an input end of the seventh PMOS transistor is connected with the first high level signal source, and the first clock signal of the current grade is input to a control end of the seventh PMOS transistor;

wherein an input end of the sixth NMOS transistor is connected with an output end of the seventh NMOS transistor, and an output end of the sixth NMOS transistor is connected with a control end of the eighth NMOS transistor, and the cascade signal of the current grade is input to a control end of the sixth NMOS transistor;

wherein an input end of the seventh NMOS transistor is connected with the low level signal source, and the first clock signal of the current grade is input to a control end of the seventh NMOS transistor;

wherein an input end of the eighth PMOS transistor is connected with an output end of the ninth PMOS transistor, an output end of the eighth PMOS transistor is connected with a control end of the tenth PMOS transistor, and the cascade signal of the current grade is input to a control end of the eighth PMOS transistor;

wherein an input end of the ninth PMOS transistor is connected with the first high level signal source, and a control end of the ninth PMOS transistor is connected with an output end of the fifth NMOS transistor;

wherein a control end of the eighth NMOS transistor is connected with a control end of the tenth PMOS transistor, an input end of the eighth NMOS transistor is connected with the low level signal source, and an input end of the eight NMOS transistor is connected with the gate driving signal generating module;

wherein an input end of the tenth PMOS transistor is connected with the first high level signal source, and an output end of the tenth PMOS transistor is connected with the gate driving signal generating module;

wherein an input end of the eleventh PMOS transistor is connected with the first high level signal source, a reset signal is input to a control end of the eleventh PMOS transistor, and an output end of the eleventh PMOS transistor is connected with a control end of the tenth PMOS transistor;

wherein an input end of the twelfth PMOS transistor is connected with an output end of the thirteenth PMOS transistor, an output end of the twelfth PMOS transistor is connected with a control end of the tenth PMOS transistor, and a control end of the twelfth PMOS transistor is connected with the gate driving signal generating module;

wherein an input end of the thirteenth PMOS transistor is connected with the first high level signal source, and the first clock signal of the current grade is input to a control end of the thirteenth PMOS transistor;

wherein an input end of the ninth NMOS transistor is connected with an output end of the tenth NMOS transistor, an output end of the ninth NMOS transistor is connected with a control end of the tenth PMOS transistor, and a control end of the ninth NMOS transistor is connected with the gate driving signal generating module;

wherein an input end of the tenth NMOS transistor is connected with the low level signal source, and an inverting first clock signal of the current grade is input to a control end of the tenth NMOS transistor.

9. The GOA circuit as claimed in claim 4, wherein the gate driving signal generating module comprises an eleventh N-type metal oxide semiconductor (NMOS) transistor, a twelfth NMOS transistor, a fourteenth P-type metal oxide semiconductor (PMOS) transistor, and a fifteenth PMOS transistor;

wherein an input end of the fourteenth PMOS transistor is connected with the first high level signal source, an output end of the fourteenth PMOS transistor is connected with the gate driving signal outputting module, and a control end of the fourteenth PMOS transistor is connected with the cascade signal latch module;

wherein an input end of the fifteenth PMOS transistor is connected with the first high level signal source, an output end of fifteenth PMOS transistor is connected with the gate driving signal outputting module, and a second clock signal of the current grade is input to a control end of the fifteenth PMOS transistor;

wherein an input end of the eleventh NMOS transistor is connected with an output end of the twelfth NMOS transistor, an output end of the eleventh NMOS transistor is connected with the gate driving signal outputting module, and a control end of the eleventh NMOS transistor is connected with the cascade signal latch module;

wherein an input end of the twelfth NMOS transistor is connected with the low level signal source, and the second clock signal of the current grade is input to a control end of the twelfth NMOS transistor.

10. A liquid crystal display (LCD) panel, comprising: a data line, a scan line, a pixel unit arranged between the data line and the scan line, and a gate driver on array (GOA) circuit;

wherein the GOA circuit comprises:

a low level signal source outputting a low level signal;

a first high level signal source outputting a first high level signal;

a second high level signal source outputting a second high level signal;

a cascade signal latch module latching a cascade signal of a current grade according to the low level signal and the first high level signal;

a gate driving signal generating module generating a preparation gate driving signal of the current grade according to the low level signal, the first high level signal, and the cascade signal of the current grade; and, a gate driving signal outputting module outputting a gate driving signal of the current grade according to the low level signal, the first high level signal, and the preparation gate driving signal of the current grade;

wherein voltage of the first high level signal is less than voltage of the second high level signal;

wherein the gate driving signal outputting module comprises a first stage inverter, a second stage inverter, and a third stage inverter;

wherein the first stage inverter outputs a primary gate driving signal of the current grade according to the low level signal, the first high level signal, and the preparation gate driving signal of the current grade;

wherein the second stage inverter outputs a secondary gate driving signal of the current grade according to the low level signal, the first high level signal, and the primary gate driving signal of the current grade;

wherein the third stage inverter outputs the gate driving signal of the current grade according to the low level signal, the second high level signal, and the secondary gate driving signal of the current grade;

wherein the third inverter comprises a third P-type metal oxide semiconductor (PMOS) transistor, a third N-type metal oxide semiconductor (NMOS) transistor, a fourth PMOS transistor, a fifth PMOS transistor, a sixth PMOS transistor, and a fourth NMOS transistor;

wherein an input end of the third NMOS transistor is connected with the low lever signal source, an output end of the third NMOS transistor is connected with a control end of the fifth PMOS transistor, and the secondary gate driving signal of the current grade is input to a control end of the third NMOS transistor;

wherein an input end of the third PMOS transistor is connected with an output end of the fourth PMOS transistor, an output end of the third PMOS transistor is connected with a control end of the fifth PMOS transistor, and the secondary gate driving signal of the current grade is input to the control end of the third PMOS transistor;

wherein an input end of the fourth PMOS transistor is connected with the second high lever signal source, and a control end of the fourth PMOS transistor is connected with an output end of the sixth PMOS transistor;

wherein an input end of the fifth PMOS transistor is connected with the second high level signal source, an output end of the fifth PMOS transistor is connected with an input end of the sixth PMOS transistor and outputs the gate driving signal of the current grade;

wherein the primary gate driving signal of the current grade is input to a control end of the sixth PMOS transistor;

wherein an input end of the fourth NMOS transistor is connected with the low level signal source, an output end of the fourth NMOS transistor is connected with a control end of the fourth PMOS transistor, and the primary gate driving signal of the current grade is input to the control end of the fourth NMOS transistor.

11. The LCD panel as claimed in claim 10, wherein the first stage inverter comprises a first P-type metal oxide semiconductor (PMOS) transistor and a first N-type metal oxide semiconductor (NMOS) transistor, wherein an input end of the first NMOS transistor is connected with the low lever signal source, an output end of the first NMOS transistor is connected with the second stage inverter, and the preparation gate driving signal of the current grade is input to a control end of the first NMOS transistor;

wherein an input end of the first PMOS transistor is connected with the first high level source, an output end of the first PMOS transistor is connected with the second stage inverter, and the preparation gate driving signal of the current grade is input to a control end of the first PMOS transistor.

12. The LCD panel as claimed in claim 10, wherein the second stage inverter comprises a second P-type metal oxide semiconductor (PMOS) transistor and a second N-type metal oxide semiconductor (NMOS) transistor, wherein an input end of the second NMOS transistor is connected with the low lever signal source, an output end of the second NMOS transistor is connected with the third stage inverter, and the primary gate driving signal of the current grade is input to a control end of the second NMOS transistor;

wherein an input end of the second PMOS transistor is connected with the first high level source, an output end of the second PMOS transistor is connected with the third stage inverter, and the primary gate driving signal of the current grade is input to a control end of the second PMOS transistor.

13. The LCD panel as claimed in claim 10, when the gate driving signal of the current grade is at a high level, the gate driving signal of the current grade is the second high level signal;

when the gate driving signal of the current grade is at a low level, the gate driving signal of the current grade is the low level signal.

14. The LCD panel as claimed in claim 10, wherein the cascade signal latch module comprises a fifth N-type metal oxide semiconductor (NMOS) transistor, a sixth NMOS transistor, a seventh NMOS transistor, an eighth NMOS transistor, a ninth NMOS transistor, a tenth NMOS transistor, a seventh P-type metal oxide semiconductor (PMOS) transistor, an eighth PMOS transistor, a ninth PMOS transistor, a tenth PMOS transistor, an eleventh PMOS transistor, a twelfth PMOS transistor, and a thirteenth PMOS transistor;

wherein an input end of the fifth NMOS transistor is connected with the low level signal source, a first clock signal of the current grade is input to a control end of the fifth NMOS transistor, and an output end of the fifth NMOS transistor is connected with an output end of the seventh PMOS transistor;

wherein an input end of the seventh PMOS transistor is connected with the first high level signal source, and the first clock signal of the current grade is input to a control end of the seventh PMOS transistor;

wherein an input end of the sixth NMOS transistor is connected with an output end of the seventh NMOS transistor, and an output end of the sixth NMOS transistor is connected with a control end of the eighth NMOS transistor, and the cascade signal of the current grade is input to a control end of the sixth NMOS transistor;

wherein an input end of the seventh NMOS transistor is connected with the low level signal source, and the first clock signal of the current grade is input to a control end of the seventh NMOS transistor;

wherein an input end of the eighth PMOS transistor is connected with an output end of the ninth PMOS transistor, an output end of the eighth PMOS transistor is connected with a control end of the tenth PMOS transistor, and the cascade signal of the current grade is input to a control end of the eighth PMOS transistor;

wherein an input end of the ninth PMOS transistor is connected with the first high level signal source, and a control end of the ninth PMOS transistor is connected with an output end of the fifth NMOS transistor;

wherein a control end of the eighth NMOS transistor is connected with a control end of the tenth PMOS transistor, an input end of the eighth NMOS transistor is connected with the low level signal source, and an input end of the eight NMOS transistor is connected with the gate driving signal generating module;

wherein an input end of the tenth PMOS transistor is connected with the first high level signal source, and an output end of the tenth PMOS transistor is connected with the gate driving signal generating module;

wherein an input end of the eleventh PMOS transistor is connected with the first high level signal source, a reset signal is input to a control end of the eleventh PMOS transistor, and an output end of the eleventh PMOS transistor is connected with a control end of the tenth PMOS transistor;

wherein an input end of the twelfth PMOS transistor is connected with an output end of the thirteenth PMOS transistor, an output end of the twelfth PMOS transistor is connected with a control end of the tenth PMOS transistor, and a control end of the twelfth PMOS transistor is connected with the gate driving signal generating module;

wherein an input end of the thirteenth PMOS transistor is connected with the first high level signal source, and the first clock signal of the current grade is input to a control end of the thirteenth PMOS transistor;

wherein an input end of the ninth NMOS transistor is connected with an output end of the tenth NMOS transistor, an output end of the ninth NMOS transistor is connected with a control end of the tenth PMOS transistor, and a control end of the ninth NMOS transistor is connected with the gate driving signal generating module;

wherein an input end of the tenth NMOS transistor is connected with the low level signal source, and an inverting first clock signal of the current grade is input to a control end of the tenth NMOS transistor.

15. The LCD panel as claimed in claim 10, wherein the gate driving signal generating module comprises an eleventh N-type metal oxide semiconductor (NMOS) transistor, a twelfth NMOS transistor, a fourteenth P-type metal oxide semiconductor (PMOS) transistor, and a fifteenth PMOS transistor;

wherein an input end of the fourteenth PMOS transistor is connected with the first high level signal source, an output end of the fourteenth PMOS transistor is connected with the gate driving signal outputting module, and a control end of the fourteenth PMOS transistor is connected with the cascade signal latch module;

wherein an input end of the fifteenth PMOS transistor is connected with the first high level signal source, an output end of fifteenth PMOS transistor is connected with the gate driving signal outputting module, and a second clock signal of the current grade is input to a control end of the fifteenth PMOS transistor;

wherein an input end of the eleventh NMOS transistor is connected with an output end of the twelfth NMOS transistor, an output end of the eleventh NMOS transistor is connected with the gate driving signal outputting module, and a control end of the eleventh NMOS transistor is connected with the cascade signal latch module;

wherein an input end of the twelfth NMOS transistor is connected with the low level signal source, and the second clock signal of the current grade is input to a control end of the twelfth NMOS transistor.

* * * * *